US012304659B2

(12) United States Patent
Datas et al.

(10) Patent No.: US 12,304,659 B2
(45) Date of Patent: May 20, 2025

(54) SYSTEM FOR HANDLING A SIDE SHELL OF AN AIRCRAFT WITH A VIEW TO ASSEMBLING A FUSELAGE BARREL OF THE AIRCRAFT AND METHOD FOR ASSEMBLING A FUSELAGE BARREL OF AN AIRCRAFT

(71) Applicant: AIRBUS OPERATIONS (S.A.S.), Toulouse (FR)

(72) Inventors: Jean-Marc Datas, Toulouse (FR); Thomas Cartereau, Toulouse (FR); Jacques Bouriquet, Toulouse (FR); André Aquila, Blagnac (FR); Nicolas Darbonville, Blagnac (FR); Thomas Autret, Blagnac (FR); Joël Barboule, Toulouse (FR); Sébastien Bayonne, Toulouse (FR); Patrick Guerin, Toulouse (FR); Sjoerd Van Der Veen, Toulouse (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 0 days.

(21) Appl. No.: 18/357,779

(22) Filed: Jul. 24, 2023

(65) Prior Publication Data
US 2024/0025561 A1    Jan. 25, 2024

(30) Foreign Application Priority Data

Jul. 25, 2022  (FR) ........................................ 2207614

(51) Int. Cl.
*B64F 5/10*     (2017.01)
*B64C 1/06*     (2006.01)

(52) U.S. Cl.
CPC ................ *B64F 5/10* (2017.01); *B64C 1/068* (2013.01)

(58) Field of Classification Search
CPC ......... B64F 5/10; B64C 1/068; B23P 2700/01
See application file for complete search history.

(56) References Cited

U.S. PATENT DOCUMENTS 2,374,894 A * 5/1945 Pioch ........................ B64F 5/10
                                                    29/466
6,408,517 B1 * 6/2002 Lehmker ................. B64C 1/068
                                                    29/469

(Continued)

FOREIGN PATENT DOCUMENTS

DE       202017105281 U1 * 10/2017 ................ B64F 5/10

OTHER PUBLICATIONS

DE202017105281U1 Translation (Year: 2017).*
French Search Report for Application No. FR 2207614, dated Mar. 2, 2023, 2 pages.

*Primary Examiner* — Michael W Hotchkiss
(74) *Attorney, Agent, or Firm* — Nixon & Vanderhye P.C.

(57)                ABSTRACT

A system for handling a side shell of an aircraft with a view to assembling a fuselage barrel of the aircraft and method for assembling a fuselage barrel of an aircraft are disclosed. The handling system includes at least two fixing devices per side shell. Each of the fixing devices is configured to be fixed to a longitudinal end of the side shell. Each of the fixing devices has a fixing part configured to be fixed on the side shell, a fixing support is configured to mount the fixing device movably on a holding device of an assembly platform, and an elastic element connecting the fixing part to the fixing support.

23 Claims, 8 Drawing Sheets

(56) References Cited

U.S. PATENT DOCUMENTS

| | | | | |
|---|---|---|---|---|
| 8,146,222 B2* | 4/2012 | Frauen | ............... | B64F 5/10 |
| | | | | 228/49.1 |
| 8,468,674 B2* | 6/2013 | Weber | ............... | B64F 5/10 |
| | | | | 29/430 |
| 8,914,979 B2* | 12/2014 | Venskus | ............ | B21J 15/142 |
| | | | | 29/897 |
| 9,132,924 B2* | 9/2015 | Stark | ............... | B23P 19/10 |
| 9,309,007 B2* | 4/2016 | Roschat | ............ | B64F 5/10 |
| 9,434,484 B2* | 9/2016 | Umlauft | ............ | B64F 5/10 |
| 9,868,549 B2* | 1/2018 | Frauen | ............... | B64F 5/10 |
| 10,835,948 B2* | 11/2020 | Oberoi | ............... | B21J 15/02 |
| 11,273,896 B2* | 3/2022 | Hirai | ............... | B64F 5/10 |
| 11,434,024 B2* | 9/2022 | Oberst | ............... | B64F 5/10 |
| 2010/0135754 A1* | 6/2010 | Weber | ............... | B64F 5/10 |
| | | | | 414/222.04 |
| 2020/0223559 A1 | 7/2020 | Oberst et al. | | |
| 2023/0391474 A1* | 12/2023 | Sui | ............... | B64F 5/50 |
| 2024/0025561 A1* | 1/2024 | Datas | ............... | B64F 5/10 |

\* cited by examiner

SYSTEM FOR HANDLING A SIDE SHELL OF AN AIRCRAFT WITH A VIEW TO ASSEMBLING A FUSELAGE BARREL OF THE AIRCRAFT AND METHOD FOR ASSEMBLING A FUSELAGE BARREL OF AN AIRCRAFT

CROSS REFERENCE TO RELATED APPLICATION

This application claims priority to French Application Number FR 2207614, filed Jul. 25, 2022, the entire contents of which is hereby incorporated by reference.

BACKGROUND

The present invention relates to a system for handling a side shell of an aircraft with a view to assembling a fuselage barrel of the aircraft and to a method for assembling a fuselage barrel of an aircraft.

A fuselage barrel of an aircraft generally comprises multiple elements, in particular a cabin floor grid of the aircraft, a lower shell, two side shells and an upper shell. These elements are manufactured independently of one another and holes for assembling them together are made before the elements are assembled. The assembly of these elements therefore requires the implementation of hole-to-hole assembly and/or part-to-part assembly techniques in order to ensure that they are properly aligned during the assembly.

In order to facilitate a good alignment of the elements of the fuselage barrel during the assembly, it is advantageous to have the option of shifting these elements by way of small movements of these elements in relation to one another. Systems for handling the elements of the fuselage barrel during assembly are not entirely satisfactory.

SUMMARY

The present disclosure contemplates a solution giving the option of shifting the elements of the fuselage barrel by way of small movements when these elements of the fuselage barrel are being handled. For this, the claimed inventor relates to a handling system intended for handling a side shell of an aircraft with a view to assembling a fuselage barrel of the aircraft, the side shell being configured for assembly at least with a lower shell of the aircraft and an upper shell, the fuselage barrel after assembly being associated with an orthogonal reference system defined by an axis X parallel to a longitudinal axis of the fuselage barrel, a horizontal axis Y and a vertical axis Z.

According to an exemplary embodiment, the handling system comprises at least two fixing devices per side shell, each of the fixing devices being intended to be fixed to a longitudinal end of the side shell, each of the fixing devices having a fixing part, a fixing support and a first elastic element;
  the fixing part being intended to be fixed on an outer surface of the side shell;
  the fixing support being intended to be mounted on a supporting device of an assembly platform, the fixing support being configured such that the fixing part and the first elastic element are movable in translation, in a plane comprising the axis X and the axis Y, in relation to the supporting device on which the fixing support is intended to be mounted;
  the first elastic element being fixed to the fixing part and to the fixing support, the first elastic element being configured to allow a displacement of the fixing part in relation to the supporting device along an axis parallel to the axis Z about a nominal position, the first elastic element having a predetermined stiffness such that the displacement of the fixing part has a predetermined displacement amplitude about the nominal position of the fixing part in relation to the fixing support.

As a result, by way of small movements about the nominal position of the fixing part, an operator can shift the side shell to which the fixing part of the fixing device is fixed. For this, the operator can manually bring the side shell into a position which will make it possible to align the side shell with another element of the fuselage barrel.

Moreover, the fixing support comprises a first end and a second end opposite the first end, the first end being intended to be mounted so as to be able to rotate in relation to the supporting device about an axis parallel to the axis X and mounted so as to be movable in translation along the axis Y in relation to the supporting device.

In addition, the fixing support moreover comprises:
  a fork having a first end and a second end opposite the first end, the first end being intended to be mounted rotatably on a rod of a reference positioning device and so as to be movable in translation along the axis Y in relation to the rod, the reference positioning device being intended to be mounted fixedly on the holding device on which the fixing device is mounted, the rod having a longitudinal axis parallel to the axis X, the rod being movable in translation along the axis X, the fixing part being connected to the fork via the first elastic element between the first end and the second end of the fork;
  a mechanical ram mounted fixedly in terms of translational movement along the axis Z on the fixing support, the mechanical ram comprising a piston configured to be driven by the mechanical ram along the axis Z, the piston comprising a free end intended to be fixed to the second end of the fork;
  the fork being able to rotate about the longitudinal axis of the rod when the piston is driven by the mechanical ram along the axis Z, the rotation of the fork being able to cause the side shell to rotate about the longitudinal axis of the fuselage barrel.

According to an exemplary embodiment, the first elastic element comprises a compression spring having an upper end fixed to the fixing part and a lower end fixed to the fixing support, the lower end being in abutment against the fixing support, the compression spring being configured to exert an expansion force upward along the axis Z against the fixing part at its upper end.

According to an exemplary embodiment, the fixing support comprises a yoke, the yoke having two legs and a plate connecting the two legs, the yoke being mounted so as to be movable in translation along the axis Y on the holding device, the yoke being connected to the holding device via a first end of the two legs, the plate connecting the two legs at a second end of the two legs that is opposite the first end of the two legs, the two legs each comprising a circular opening, the circular opening of each of the two legs each having a center aligned along an axis parallel to the axis X, the circular opening of each of the two legs being intended to receive a pin,
  the mechanical ram being fixed on the plate of the yoke such that the free end of the piston of the mechanical ram is between the two legs of the yoke, the free end of the piston of the mechanical ram having a ring intended to receive the pin, the free end of the piston of the mechanical ram being configured to be fixed to the second end of the fork by way of introduction of the pin into the circular opening of each of the two legs and into the ring.

Moreover, the fixing support comprises:
a fixing element intended to be fixed to the holding device;
a second elastic element connecting the yoke to the fixing element, the second elastic element being configured to allow a displacement of the yoke in relation to the fixing element along an axis parallel to the axis Y, the second elastic element having a predetermined stiffness such that the displacement has a predetermined amplitude about a nominal position of the yoke in relation to the fixing element;
the first end of the fork comprising:
a support portion intended to be mounted rotatably on the rod of the reference positioning device;
a third elastic element, the third elastic element connecting the second end of the fork and the support portion, the third elastic element being configured to allow a displacement of the fork in relation to the support portion along an axis parallel to the axis Y, the third elastic element having a predetermined stiffness such that the displacement has a predetermined amplitude about a nominal position of the fork in relation to the support portion.

According to an exemplary embodiment, the handling system comprises a fourth elastic element connecting the supporting device to the fixing part, the fourth elastic element being configured to allow a displacement of the fixing part in relation to the supporting device along an axis parallel to the axis X about a nominal position, the fourth elastic element having a predetermined stiffness such that the displacement of the fixing part has a predetermined displacement amplitude about the nominal position of the fixing part in relation to the supporting device.

According to an exemplary embodiment, the first elastic element comprises a tension spring having an upper end fixed to the fixing support and a lower end fixed to the fixing part, the lower end hanging freely from the fixing support, the tension spring being configured to exert a tensile force upward along the axis Z on the fixing part at its lower end.

According to an exemplary embodiment, the fixing support comprises a fixing element intended to be fixed to the holding device, the mechanical ram being mounted so as to be movable in translation along the axis X at the fixing element,
the first elastic element being mounted so as to be movable in translation at the fork along the axis Y.

Moreover, the fixing support comprises at least one first guide rail fixed on the fixing element parallel to the axis X for mounting the mechanical ram at the fixing element so as to be movable in translation along the axis X,
the fixing support comprises at least one second guide rail fixed on the fork parallel to the axis Y for mounting the first elastic element at the fork so as to be movable in translation along the axis Y.

According to an exemplary embodiment, the handling system comprises an elastic device connecting the supporting device to the fixing part, the elastic device being configured to allow a displacement of the fixing part in relation to the supporting device along an axis parallel to the axis X and along an axis parallel to the axis Y about a nominal position, the elastic device having a predetermined stiffness such that the displacement of the fixing part has a predetermined displacement amplitude about the nominal position of the fixing part in relation to the supporting device.

Furthermore, the fixing part comprises:
a fixing frame having at least one upright shaped to closely follow at least in part the outer surface of the side shell, the one or more uprights being intended to fix the fixing part on the outer surface of the side shell;
a fixing bar having a longitudinal axis parallel to the axis X, the fixing bar being fixed to the first elastic element.

For example, the first elastic element comprises at least one helical spring.

In addition, the fixing part moreover comprises a first guiding crossmember having a longitudinal axis parallel to the axis Z, the first guiding crossmember having a first end mounted so as to be able to rotate about the axis X at the fork, the first guiding crossmember having a second end mounted to as to be movable in translation at the fixing bar, the helical spring having a first end fixed to the fork and a second end fixed to the fixing bar, the helical spring surrounding the first guiding crossmember, the first elastic element moreover comprises at least one second guiding crossmember parallel to the first guiding crossmember, the second guiding crossmember having a first end mounted so as to be able to rotate about the axis X at the fork, the second guiding crossmember having a second end mounted so as to be movable in translation at the fixing bar.

In addition, the fixing part moreover comprises a guiding crossmember having a longitudinal axis parallel to the axis Z, the guiding crossmember having a first end and a second end, the first end of the guiding crossmember being fixed to the fixing bar, the guiding crossmember passing through the fork between its first end and its second end, the helical spring having a first end fixed to the second end of the guiding crossmember and a second end fixed to the fixing bar, the helical spring surrounding the guiding crossmember.

Furthermore, the handling system moreover comprises at least one holding structure configured to maintain the shape of the side shell, the holding structure comprising:
an arcuately curved bar intended to be fixed to the side shell such that it is located in a plane perpendicular to the axis X, the curved bar having a first end intended to be fixed to an upper edge of the side shell and a second end intended to be fixed on an inner surface of the side shell;
a straight bar having two ends respectively fixed to the first end of the curved bar and to the second end of the curved bar;
a stay having a first end comprising a plate fixed to the curved bar and the straight bar, the plate being comprised in a plane comprising the curved bar and the straight bar, the stay moreover comprising a second end intended to be fixed to the inner surface of the side shell, the stay having a longitudinal axis forming a non-zero angle with the plate.

Furthermore, the handling system moreover comprises at least one alignment module comprising:
an aligning pin intended to be fixed on an inner surface of the upper shell;
a receiving interface having a cylinder intended to be fixed to the first end of the curved bar, a first piston and a fifth elastic element, the first piston being able to slide in the cylinder, the first piston having a receiving surface intended to receive the aligning pin, the cylinder and the first piston having longitudinal axes parallel to the axis Z, the first piston being movable in translation along the axis Z in relation to the cylinder of the receiving interface, the fifth elastic element being configured to exert a force along the axis Z against the first piston, said force tending to bring the first piston into a nominal position along the axis Z if no force is applied to the receiving surface.

In addition, the receiving interface moreover comprises at least one sixth elastic element configured to exert a force in a plane parallel to the axis X and the axis Y against the first piston, said force tending to bring the first piston into a nominal position along the axis X and the axis Y.

Moreover, the receiving interface comprises:
a second piston having a longitudinal axis parallel to the axis Z, the second piston being movable in translation in a plane parallel to the axis X and the axis Y in relation to the cylinder of the receiving interface and fixed along the axis Z, the first piston being able to slide in the second piston;
at least one adjusting element configured to regulate a position of the second piston in a plane parallel to the axis X and the axis Y.

For example, the alignment module comprises:
three adjusting elements distributed uniformly around the cylinder, each of the three adjusting elements comprises a screw screwed in an opening through the cylinder, the screw of each of the three adjusting elements having longitudinal axes comprised in a common plane parallel to the axis X and the axis Y, the longitudinal axes of each screw being concurrent, the screw of each of the three adjusting elements comprising a first end configured to receive a tool for screwing or unscrewing the screw and a second end configured to exert a force parallel to the longitudinal axis of the screw against the second piston depending on the degree of screwing and unscrewing of the screw;
three seventh elastic elements distributed uniformly around the cylinder, each of the seventh elastic elements being able to exert a force against the first piston.

The present disclosure also relates to a method for assembling a fuselage barrel of an aircraft using a handling system as specified above.

According to an exemplary embodiment, the method comprises:
a step of installing a lower shell of the fuselage barrel on an assembly platform,
a step of fixing two side shells of the fuselage barrel, each of the two side shells being fixed to two fixing devices of the handling system, each of the two side shells being fixed to two fixing devices by means of the fixing part of each of the two fixing devices,
a step of aligning the two side shells in relation to the lower shell along a plane comprising the axis X and the axis Y by handling the two side shells using the fixing support of the handling system,
a step of aligning the two side shells in relation to the lower shell along an axis parallel to the axis Z by handling the two side shells using the first elastic element of the handling system,
a step of assembling the two side shells with the lower shell.

Furthermore, the method moreover comprises the following steps:
a step of fixing at least one holding structure of the handling system to the inner surface of each of the side shells,
a step of fixing at least one aligning pin on the inner surface of an upper shell of the fuselage barrel,
a step of depositing the aligning pin on the receiving surface by moving the upper shell closer to the side shells,
a step of aligning the upper shell in relation to the side shells along a plane comprising the axis X and the axis Y using the receiving interface of the alignment module,
a step of assembling the upper shell with the side shells.

In addition, the method comprises a step of positioning a floor grid of the aircraft before the depositing step.

BRIEF DESCRIPTION OF THE DRAWINGS

For an understanding of embodiments of the disclosure, reference is now made to the following description taken in conjunction with the accompanying drawings.

DETAILED DESCRIPTION

Some embodiments will now be described with reference to the Figures.

Figure 15:
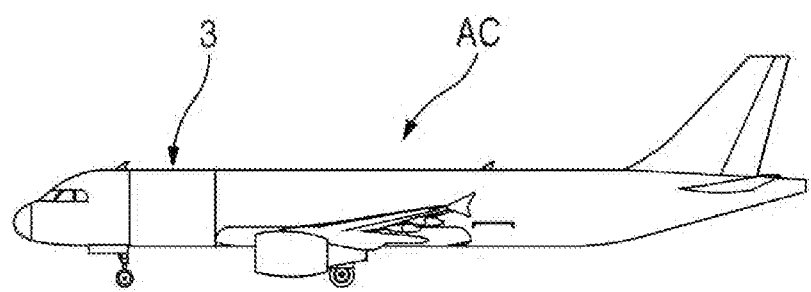
FIG. 15 is a lateral view of an aircraft having a fuselage barrel.

The handling system 1 is intended to handle a side shell 2 of an aircraft with a view to assembling a fuselage barrel 3 of the aircraft AC (FIG. 15).

Figure 4:
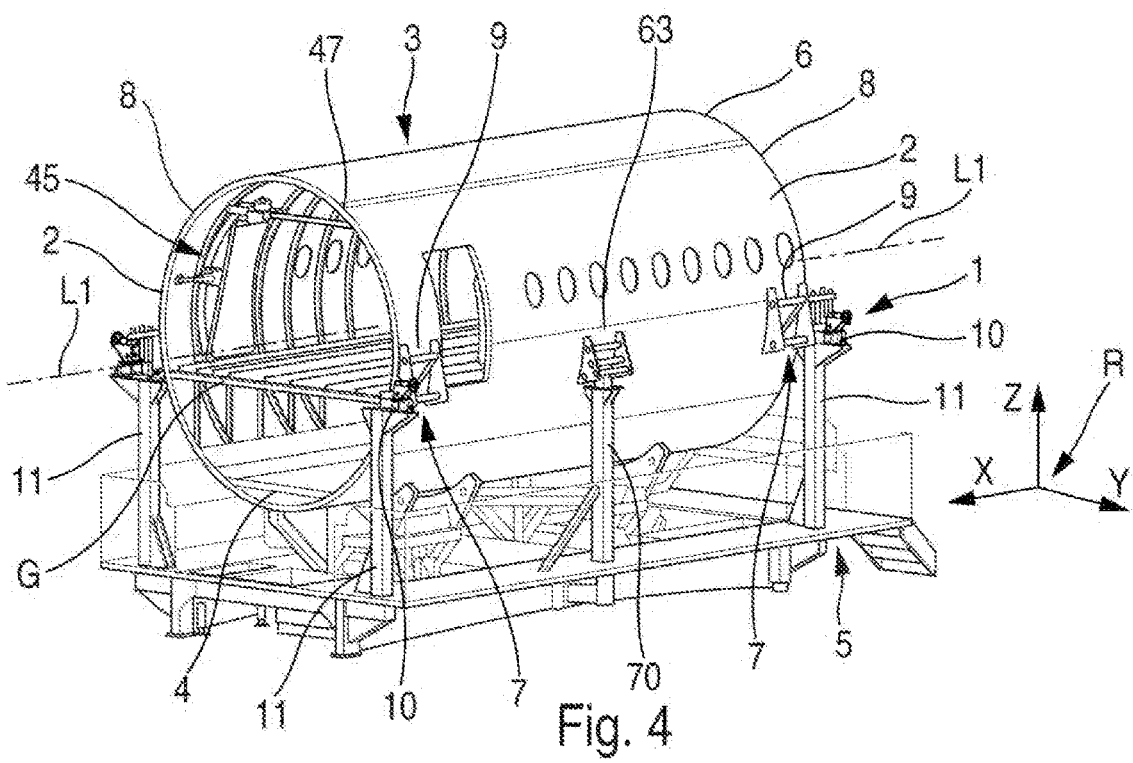
FIG. 4 is a perspective view of a fuselage barrel on an assembly platform having a handling system according to an exemplary embodiment.

The side shell 2 is configured to be assembled at least with a lower shell 4 of the aircraft, which lower shell is received on an assembly platform 5, and an upper shell 6, as shown in FIG. 4.

After assembly, the fuselage barrel 3 is associated with an orthogonal reference system R defined by an axis X parallel to a longitudinal axis L1 of the fuselage barrel 3, a horizontal axis Y and a vertical axis Z.

The longitudinally opposite ends of an object are referred to as "longitudinal ends" of the object. The adjective "vertical" and the adverb "vertically" refer to the direction of gravity.

In addition, the adjectives "upper" and "lower" are defined in relation to the ground on which the handling system 1 is able to be displaced. An object qualified by the adjective "lower" is located closer to the ground than an object qualified by the adjective "upper". The adjectives "inner" and "outer" are defined in relation to the fuselage barrel 3. An object or a surface is referred to as "inner" when it faces the inside of the fuselage barrel 3. It is referred to as "outer" when it faces the outside of the fuselage barrel 3. The terms "upward" and "downward" are defined in relation to the ground. An object being displaced downward corresponds to an object being displaced toward the ground. An object being displaced upward corresponds to an object being moved in a direction away from the ground.

The handling system 1 comprises at least two fixing devices 7 per side shell 2. Each of the fixing devices 7 is intended to be fixed to a longitudinal end 8 of the side shell 2.

Each of the fixing devices 7 has a fixing part 9, a fixing support 10 and a first elastic element 12.

The fixing part 9 is intended to be fixed on an outer surface E of the side shell 2.

The fixing support 10 is intended to be mounted on a holding device 11 of an assembly platform 5. The fixing support 10 is configured such that the fixing part 9 and the first elastic element 12 are movable in translation, in a plane comprising the axis X and the axis Y, in relation to a holding device 11 of an assembly platform 5. For example, the holding device 11 corresponds to an alignment post of the assembly platform 5, as shown in FIG. 4. The fixing support 10 may be fixed to the top of the alignment post.

The first elastic element 12 is fixed to the fixing part 9 and to the fixing support 10. The first elastic element 12 is configured to allow a displacement of the fixing part 9 in relation to the supporting device 11 along an axis parallel to the axis Z about a nominal position. The first elastic element 12 moreover has a predetermined stiffness such that the displacement of the fixing part 9 has a predetermined displacement amplitude about the nominal position of the fixing part 9 in relation to the fixing support 10. For example, the nominal position of the fixing part 9 in relation to the fixing support 10 corresponds to a position in which the fixing part 9 is not subjected to load by a force except for that of the first elastic element 12.

Advantageously, the fixing support 10 comprises a first end 131 and a second end 132 opposite the first end 131. The first end 131 is intended to be mounted so as to be able to rotate in relation to the supporting device 11 about an axis L2 parallel to the axis X and mounted so as to be movable in translation along the axis Y in relation to the supporting device 11. The fixing support 10 may moreover comprise at least one fork 13 and a mechanical ram 16.

The fork 13 has a first end 131 and a second end 132 opposite the first end 131. The first end 131 is intended to be mounted rotatably on a rod 14 of a reference positioning device 15 and so as to be movable in translation along the axis Y in relation to the rod 14.

Figure 9:
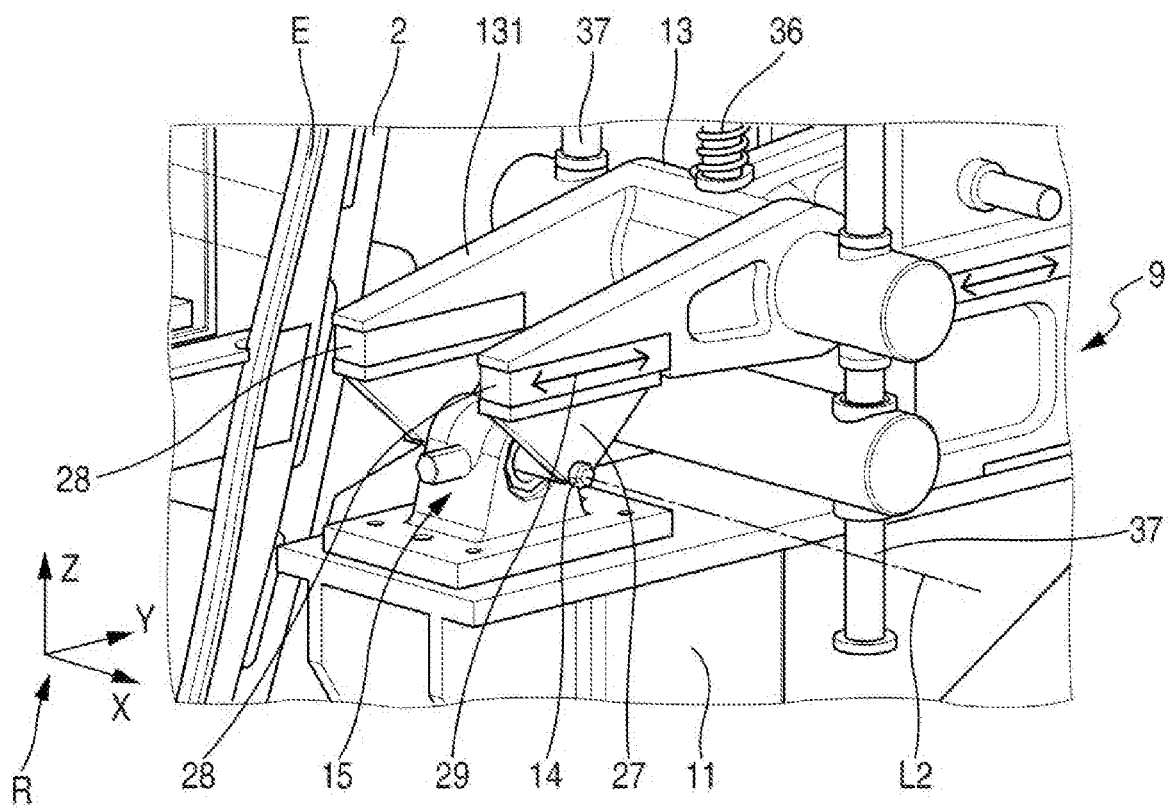
FIG. 9 is a perspective view of the first end of the fork according to an exemplary embodiment.
Figure 10:
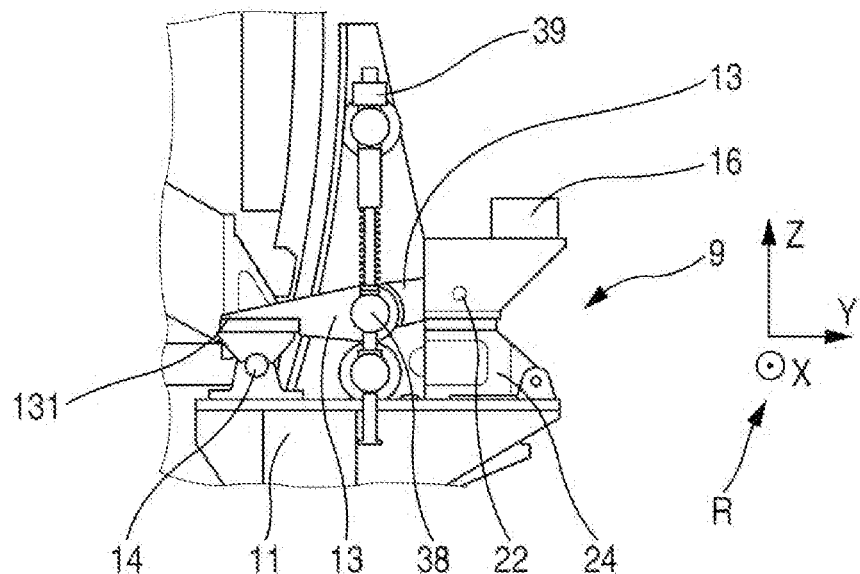
FIG. 10 is a profile view of the fixing device according to an exemplary embodiment.

Said reference positioning device 15 is intended to be mounted fixedly on the holding device 11 on which the fixing device 7 is mounted. The rod 14 has a longitudinal axis L2 parallel to the axis X. Furthermore, the rod 14 is movable in translation along the axis X (FIG. 9).

The fixing part 9 is connected to the fork 13 via the first elastic element 12 between the first end 131 and the second end 132 of the fork 13.

Figure 8:
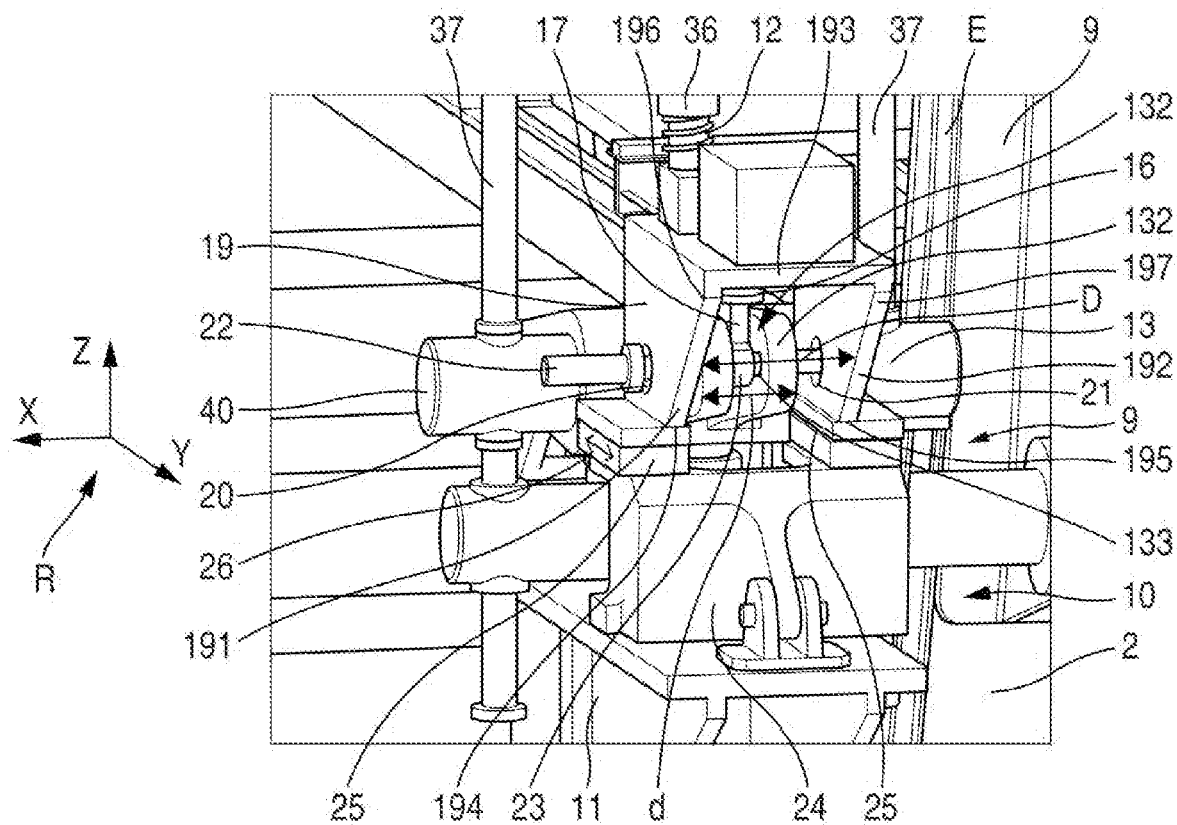
FIG. 8 is a perspective view of a yoke of the fixing support according to an exemplary embodiment.

The mechanical ram 16 is mounted fixedly in terms of translational movement along the axis Z on the fixing support 10. The mechanical ram 16 comprises a piston 17 configured to be driven by the mechanical ram 16 along the axis Z. The piston 17 comprises a free end intended to be fixed to the second end 132 of the fork 13 (FIG. 8).

The fork 13 is therefore able to rotate about the longitudinal axis L2 of the rod 14 when the piston 17 is driven by the mechanical ram 16 along the axis Z. The rotation of the fork 13 is then able to cause the side shell 2 to rotate about the longitudinal axis L1 of the fuselage barrel 3.

Specifically, when the piston 17 is driven upward by the mechanical ram 16, the second end 132 of the fork 13 is driven upward by way of a rotation of the fork 13 about the longitudinal axis L2 of the rod 14 on which the first end 131 of the fork 13 is rotatably mounted. The driving of the second end 132 upward causes the first elastic element 12 and the fixing part 9 to be driven upward. The side shell is fixed to the fixing part 9. As a result, this rotation of the fork 13 causes the side shell 2, to which the fixing part 9 is fixed, to move upward in translation in the direction of displacement of the fixing part 9. Similarly, when the piston 17 is driven downward by the mechanical ram 16, the second end 132 of the fork 13 is driven downward by way of a rotation of the fork 13 about the longitudinal axis L2 of the rod 14. The driving of the second end 132 downward causes the first elastic element 12 and the fixing part 9 to be driven downward, this causing the side shell 2, to which the fixing part 9 is fixed, to move downward in translation in the direction of displacement of the fixing part 9.

According to a first embodiment, the first elastic element 12 comprises a compression spring 121 having an upper end fixed to the fixing part 9 and a lower end fixed to the fixing support 10. The compression spring 121 may comprise a longitudinal axis parallel to the axis Z. The lower end is in abutment against the fixing support 10. The compression spring 121 is configured to exert an expansion force upward along the axis Z against the fixing part 9 at its upper end. The fixing part 9 therefore rests on the compression spring 121 which itself rests on the fixing support 10. As a result, the compression spring 121 allows a displacement of the fixing part 9 about the nominal position in a direction parallel to the axis Z. The compression spring 121 may correspond to a helical compression spring.

According to the first embodiment shown in FIG. 1, FIG. 2, FIG. 3, FIG. 8, FIG. 9 and FIG. 10, the fixing support 10 may comprise a yoke 19.

The yoke 19 has two legs 191, 192 and a plate 193 connecting the two legs 191, 192. The yoke 19 is mounted so as to be movable in translation along the axis Y on the holding device 11. The yoke 19 is connected to the holding device 11 by way of a first end 194, 195 of the two legs 191, 192.

The plate 193 connects the two legs 191, 192 at a second end 196, 197 of the two legs 191, 192 that is opposite the first end 194, 195 of the two legs 191, 192.

The two legs 191, 192 each comprise a circular opening 20, 21. The circular openings 20, 21 of the two legs 191, 192 have a center aligned along an axis parallel to the axis X. The circular opening 20, 21 of each of the two legs 191, 192 is intended to receive a pin 22.

The mechanical ram 16 is fixed on the plate 193 of the yoke 19 such that the free end of the piston 17 of the mechanical ram 16 is located between the two legs 191, 192 of the yoke 19. The free end of the piston 17 of the mechanical ram 16 has a ring 23 intended to receive the pin 22.

The ring 23 has a circle with a center comprised on a straight line comprising the center of the circular opening 20, 21 of each of the legs 191, 192. The second end 132 of the fork 12 comprises at least one ring 133. The free end of the piston 17 of the mechanical ram 16 is configured to be fixed to the second end 132 of the fork 13 by way of the introduction of the pin 22 into the circular opening 20, 21 of each of the two legs 191, 192, into the one or more rings 133 of the second end 132 of the fork 13, and into the ring 23.

The two legs 191, 192 may have a spacing D between them which has a predetermined dimension allowing the fork 13 to move in translation along the axis X between the two legs 191, 192. For example, the spacing D is greater than the dimension along the axis X of the second end 132 of the fork 13. The dimension along the axis X of the second end 132 of the fork may correspond to the dimension d as shown in FIG. 8. The spacing D may also be greater than the desired amplitude of displacement in translation of the fork 13 along the axis X. To that end, the difference between the dimension D and the dimension d corresponds to said desired displacement amplitude.

The fixing support 10 may moreover comprise a fixing element 24 intended to be fixed to the holding device 11 and a second elastic element 25. The second elastic element 25 connects the yoke 19 to the fixing element 24. The second elastic element 25 is configured to allow a displacement 26 (shown by a double-headed arrow) of the yoke 19 in relation to the fixing element 24 along an axis parallel to the axis Y. The second elastic element 25 has a predetermined stiffness such that the displacement 26 has a predetermined amplitude about a nominal position of the yoke 19 in relation to the fixing element 24. For example, the nominal position of the yoke 19 in relation to the fixing element 24 corresponds to a position in which the yoke 19 is not subjected to load by a force except for that of the second elastic element 25.

The first end 131 of the fork 13 may also comprise a support portion 27 intended to be mounted on the rod 14 of the reference positioning device 15 so as to be able to rotate about the axis X and a third elastic element 28.

The third elastic element 28 connects the second end 132 of the fork 13 and the support portion 27. The third elastic element 28 is configured to allow a displacement 29 of the fork 13 in relation to the support portion 27 along an axis parallel to the axis Y. The third elastic element 28 has a predetermined stiffness such that the displacement 29 has a predetermined amplitude about a nominal position of the fork 13 in relation to the support portion 27. For example, the nominal position of the fork 13 in relation to the support portion 27 corresponds to a position in which the fork 13 is not subjected to load by a force except for that of the third elastic element 28.

Non-limitingly, the second elastic element 25 and the third elastic element 28 may correspond to a layer made of elastic material, such as Teflon. According to the first embodiment, the handling system 1 may comprise a fourth elastic element (not shown) connecting the supporting device 11 to the fixing part 9. The fourth elastic element is configured to allow a displacement of the fixing part 9 in relation to the supporting device 11 along an axis parallel to the axis X about a nominal position. The fourth elastic element has a predetermined stiffness such that the displacement of the fixing part 9 has a predetermined displacement amplitude about the nominal position of the fixing part 9 in relation to the supporting device 11.

According to a second embodiment, the first elastic element 12 comprises a tension spring 121 having an upper end fixed to the fixing support 10 and a lower end fixed to the fixing part 9. The tension spring 121 may comprise a longitudinal axis parallel to the axis Z. The lower end hangs freely from the fixing support 10. The tension spring 121 is configured to exert a tensile force upward along the axis Z on the fixing part 9 at its lower end. The fixing part 9 therefore hangs from the fixing support 10 via the tension spring 121. As a result, the tension spring 121 allows a displacement of the fixing part 9 about the nominal position in a direction parallel to the axis Z. The tension spring 121 may correspond to a helical tension spring.

Figure 5:
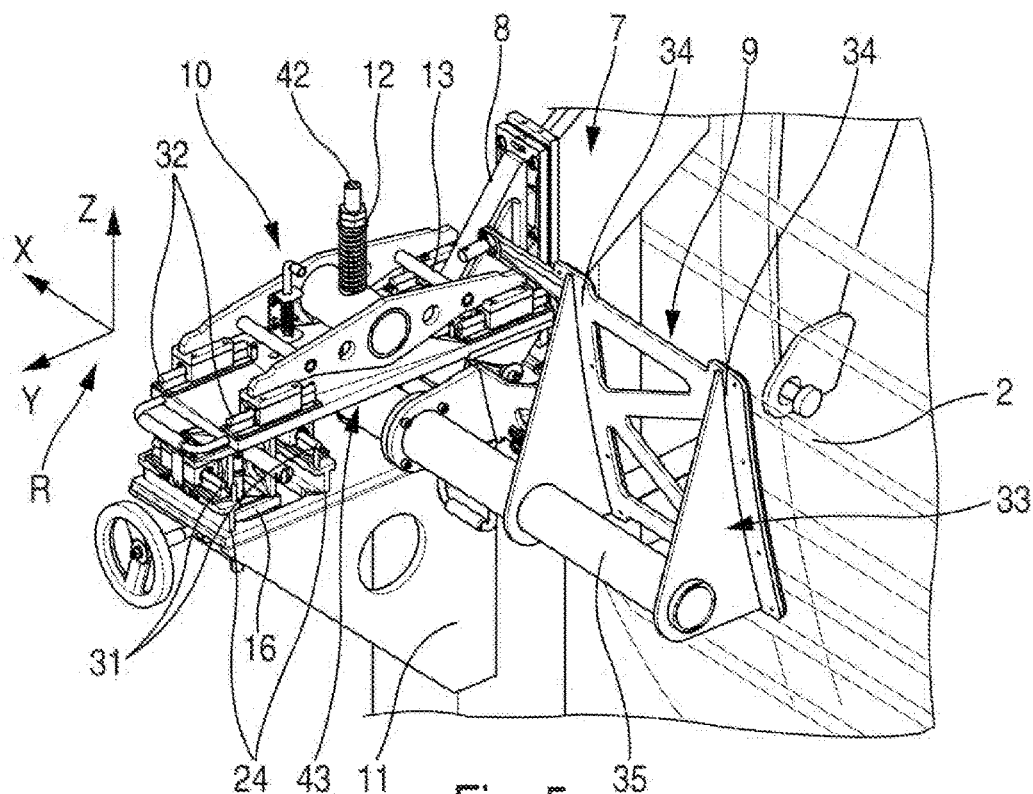
FIG. 5 is a perspective view of the fixing device according to an exemplary embodiment.
Figure 6:
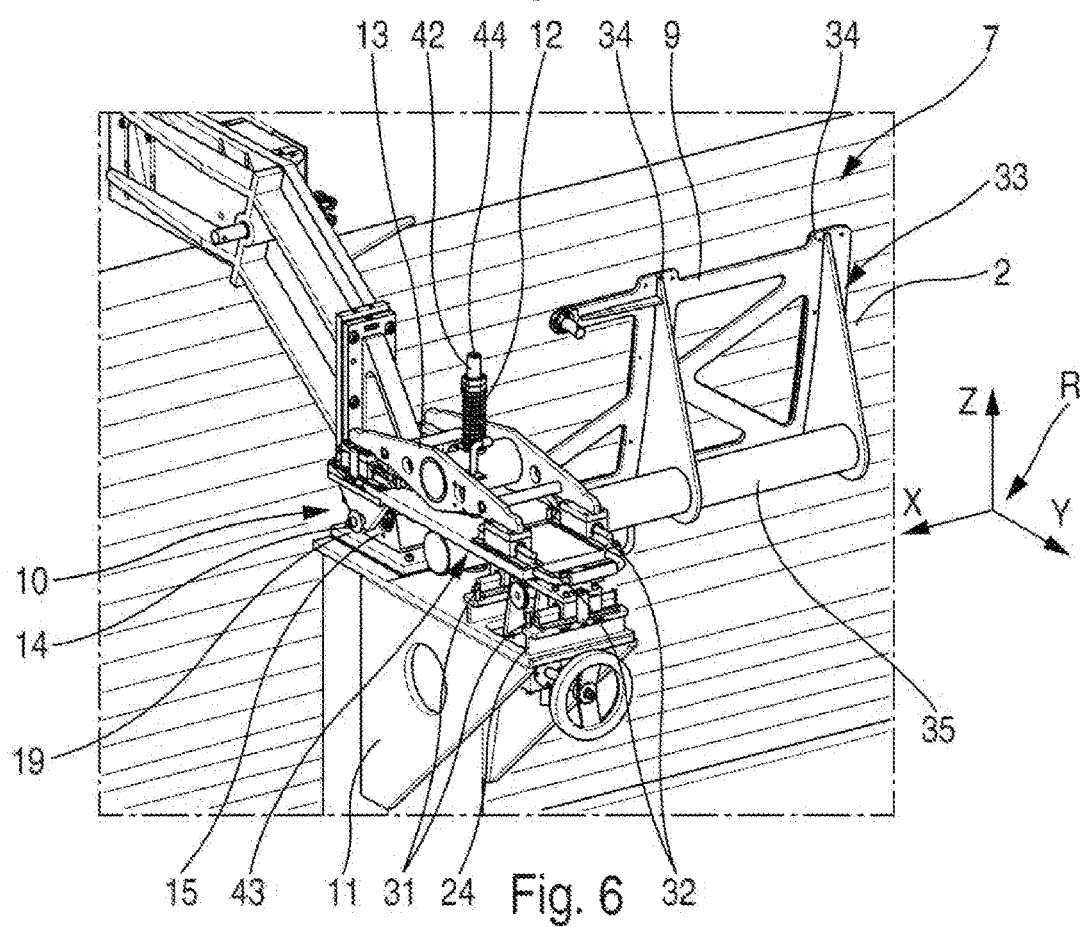
FIG. 6 is a perspective view, from a different viewing angle to that of FIG. 5, of the fixing device according to an exemplary embodiment.

According to the second embodiment shown in FIG. 5 and FIG. 6, the fixing support 10 comprises a fixing element 24 intended to be fixed to the holding device 11. The mechanical ram 16 is mounted so as to be movable in translation along the axis X at the fixing element 24. The first elastic element 12 is mounted so as to be movable in translation at the fork 13 along the axis Y.

The fixing support 10 may comprise at least one first guide rail 31 fixed on the fixing element 24. The one or more first guide rails are fixed parallel to the axis X for mounting the mechanical ram 16 at the fixing element 24 so as to be movable in translation along the axis X. In addition, the fixing support 10 may comprise at least one second guide rail 32 fixed on the fork 13. The one or more second guide rails 32 are fixed parallel to the axis Y for mounting the first elastic element 12 at the fork 13 so as to be movable in translation along the axis Y.

As shown in FIG. 5 and FIG. 6, the fixing support 10 may comprise two first guide rails 31 parallel to the axis X and two second guide rails 32 parallel to the axis Y.

According to the second embodiment, the handling system 1 may comprise an elastic device (not shown) connecting the supporting device 11 to the fixing part 9. The elastic device is configured to allow a displacement of the fixing part 9 in relation to the supporting device 11 along an axis parallel to the axis X and along an axis parallel to the axis Y about a nominal position. The elastic device has a predetermined stiffness such that the displacement of the fixing part 9 has a predetermined displacement amplitude about the nominal position of the fixing part 9 in relation to the supporting device 11. The elastic device may comprise two elastic elements intended to enable said displacement of the fixing part 9 in relation to the supporting device 11 along an axis parallel to the axis X and along an axis parallel to the axis Y about a nominal position respectively.

As regards the fixing part 9, it may comprise a fixing frame 33 and a fixing bar 35.

The fixing frame 33 has at least one upright 34 shaped to closely follow at least in part the outer surface E of the side shell 2. The one or more uprights 34 are intended to fix the fixing part 9 on the outer surface E of the side shell 2. The fixing bar 35 has a longitudinal axis parallel to the axis X. The fixing bar 35 is fixed to the first elastic element 12.

The fixing part 9 may also comprise a first guiding crossmember 36 having a longitudinal axis parallel to the axis Z. The first guiding crossmember 36 has a first end 38 mounted so as to be able to rotate about the axis X at the fork 13. The first guiding crossmember 36 has a second end 39 mounted so as to be movable in translation at the fixing bar 35.

For example, the first elastic element 12 comprises at least one helical spring 121.

According to the first embodiment described above, the compression spring 121 is a helical compression spring. The helical compression spring tends to move its opposite ends apart when subjected to axial compression. Said helical spring 121 has a first end 122 (corresponding to a lower end of the helical spring 121) fixed to the fork 13 and a second end 123 (corresponding to an upper end of the helical spring 121) fixed to the fixing bar 35. The helical spring 121 surrounds the first guiding crossmember 36, that is to say the helical spring 121 has a central axis which coincides with the central axis of the first guiding crossmember 36.

Figure 1:
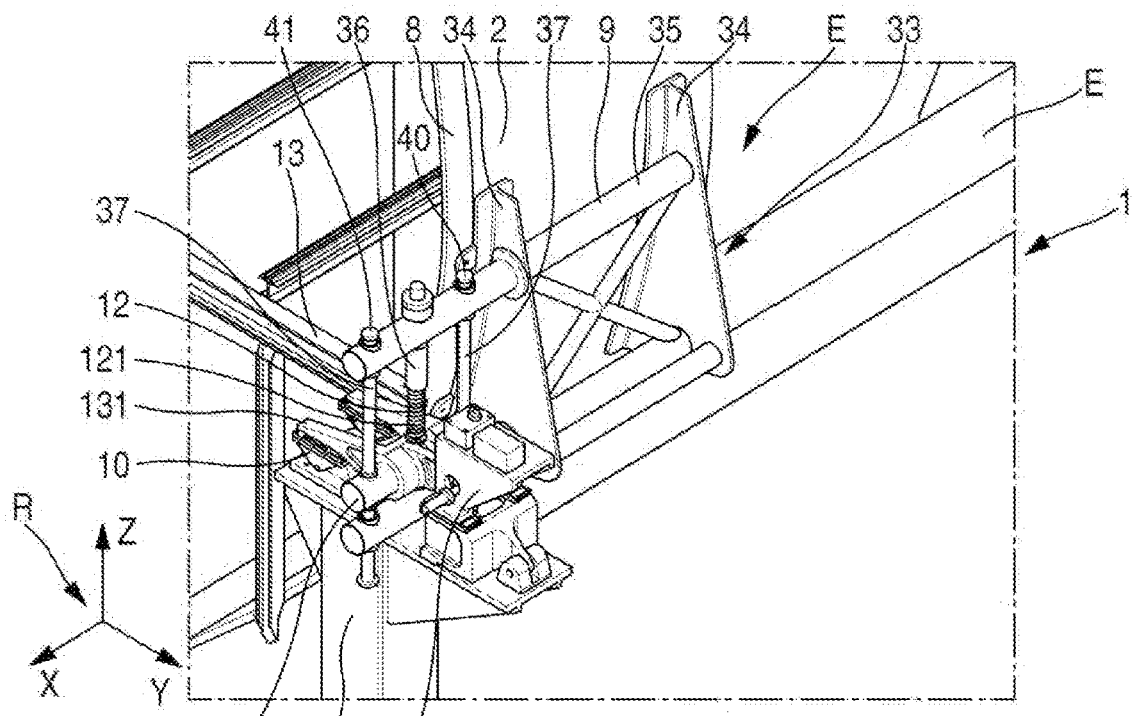
FIG. 1 is a perspective view of a fixing device according to an exemplary embodiment.
Figure 2:
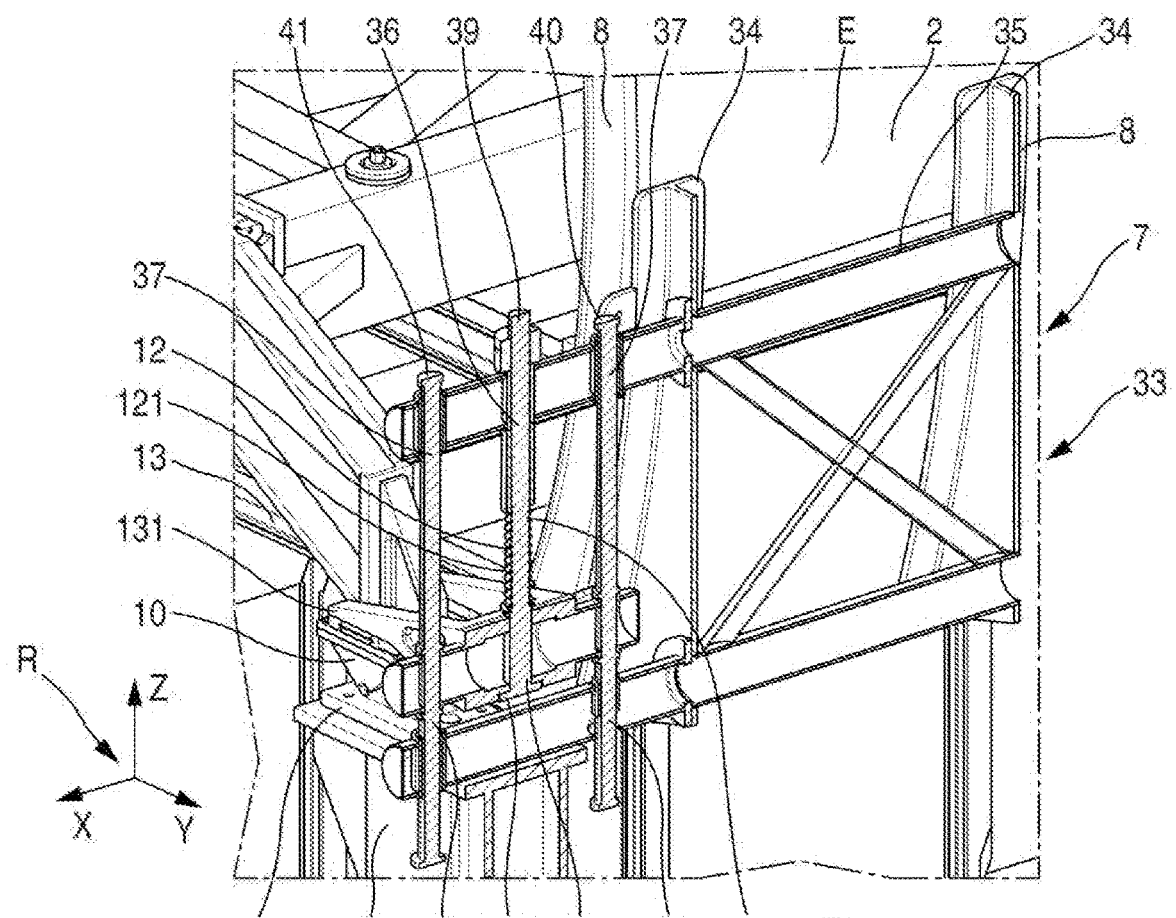
FIG. 2 is a perspective view of a section along a plane parallel to the axis X and the axis Z of a fixing device according to an exemplary embodiment.

The fixing part 9 moreover comprises at least one second guiding crossmember 37 parallel to the first guiding crossmember 36. As shown in FIG. 2, the first elastic element 12 comprises two second guiding crossmembers 37. The two second guiding crossmembers 37 and the first guiding crossmember 36 have longitudinal axes comprised in a common plane parallel to the axis X and the axis Z. The first guiding crossmember 36 is located between the two second guiding crossmembers 37.

The second guiding crossmember 37 has a first end 40 mounted so as to be rotatable about the axis X at the fork 13. The second guiding crossmember 37 also has a second end 41 mounted so as to be movable in translation at the fixing bar 35. As a result, the fixing bar 35 therefore bears against the helical spring 121 along the axis Z. The helical spring 121 in abutment against the fork 13 is configured to exert a force upward along the axis Z against the fixing bar 35 in order to push the fixing bar 35 upward.

According to the second embodiment described above, the tension spring 121 is a helical tension spring. The helical tension spring tends to move its opposite ends closer together when subjected to axial tension. The fixing part 9 moreover comprises a guiding crossmember 42 having a longitudinal axis parallel to the axis Z. The guiding crossmember 42 has a first end 43 and a second end 44.

The first end 43 of the guiding crossmember 42 is fixed to the fixing bar 35. The guiding crossmember 42 passes through the fork 13 between the first end 43 of the guiding crossmember 42 and the second end 44 of the guiding crossmember 44. The helical spring 121 has a first end (corresponding to an upper end of the helical spring 121) fixed to the second end 44 of the guiding crossmember 42 and a second end 122 (corresponding to a lower end of the helical spring 121) fixed to the fixing bar 35. The helical spring 121 surrounds the guiding crossmember 42. As a result, the fixing bar 35 hangs from the helical spring 121 along the axis Z. The helical spring 121 exerts a force upward along the axis Z in order to draw the fixing bar 35 upward.

Figure 3:
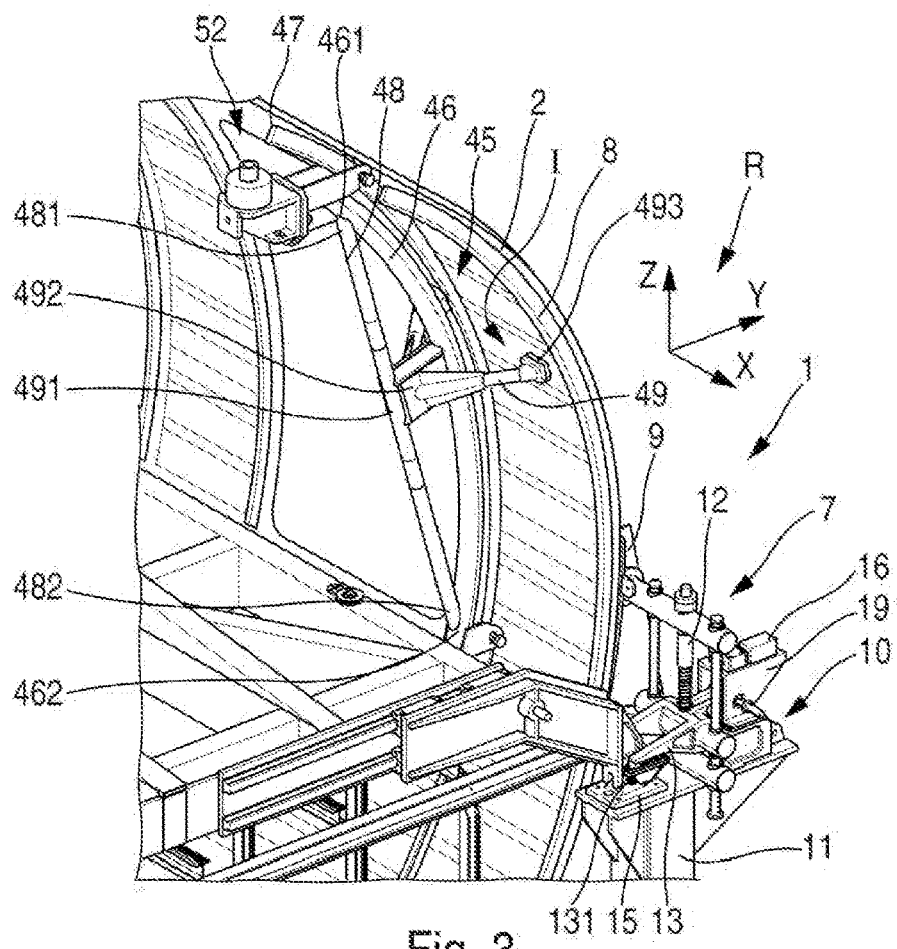
FIG. 3 is a perspective view of a holding structure.
Figure 11:
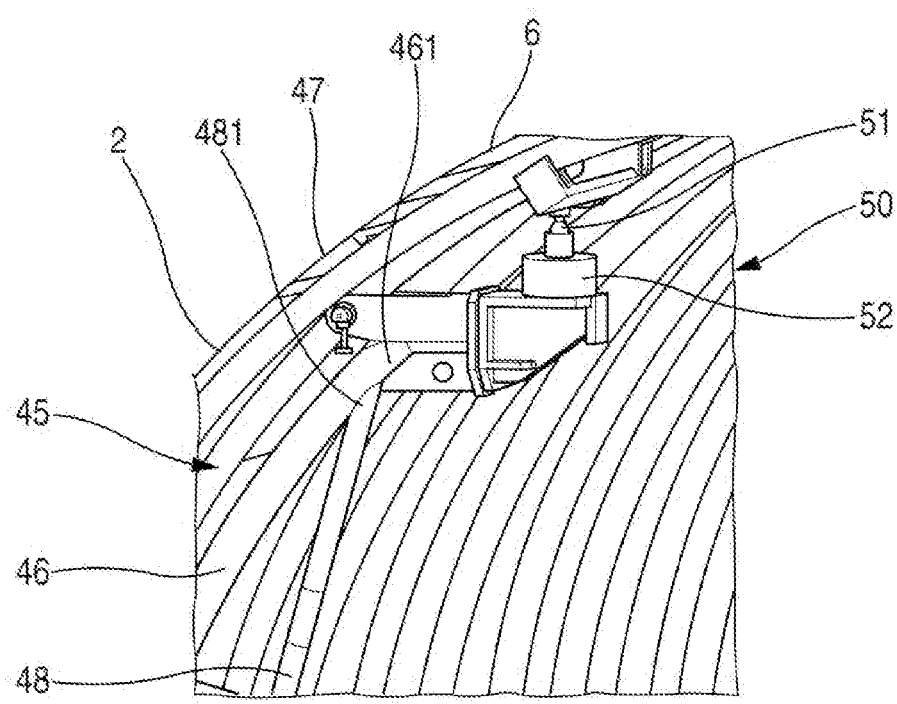
FIG. 11 is a perspective view of an alignment module comprising a receiving interface and an aligning pin.

The handling system 1 may moreover comprise at least one holding structure 45 configured to maintain the shape of the side shell 2. As shown in FIGS. 3, 4, and 11, the holding structure 45 comprises a curved bar 46, a straight bar 48 and a stay 49.

The curved bar 46 has an arc shape. The arc shape corresponds to a shape substantially matching the inner surface of the side shell 2. The curved bar 46 is intended to be fixed to the side shell 2 such that it is located in a plane perpendicular to the axis X. The curved bar 46 has a first end 461 intended to be fixed to an upper edge 47 of the side shell 2 and a second end 462 intended to be fixed on an inner surface I of the side shell 2. The curved bar 46 is fixed to the side shell 2 such that the curvature of the curved bar 46 runs parallel to the curvature of the inner surface I of the side shell 2.

The straight bar 48 has two ends 481, 482 fixed respectively to the first end 461 of the curved bar 46 and to the second end 462 of the curved bar 46. The stay 49 has a first end 491 having a plate 492 fixed to the curved bar 46 and the straight bar 48. The plate 492 is comprised in a plane comprising the curved bar 46 and the straight bar 48. The stay 49 moreover comprises a second end 493 intended to be fixed to the inner surface I of the side shell 2. The stay 49 has a longitudinal axis forming a non-zero angle with the plate 492. The stay 49 makes it possible to maintain the position of the holding structure 45.

In addition, the handling system 1 may comprise at least one alignment module 50 as shown in FIG. 11. The alignment module 50 comprises an aligning pin 51 (FIG. 11) and a receiving interface 52 (FIGS. 11 to 14 and FIG. 3). The aligning pin 51 is fixed on an inner surface of the upper shell 6. The receiving interface 52 has a cylinder 53 fixed to the first end 461 of the curved bar 46, a first piston 54 and a fifth elastic element 55. The first piston 54 is able to slide in the cylinder 53. The first piston 54 has a receiving surface 56 intended to receive the aligning pin 51. The receiving surface 56 receives the aligning pin 51 when the upper shell 6 is placed on the side shells 2. The cylinder 53 and the first piston 54 have longitudinal axes L3 parallel to the axis Z. The first piston 54 is movable in translation along the axis Z in relation to the cylinder 53 of the receiving interface 52.

The fifth elastic element 55 is configured to exert a force along the axis Z against the first piston 54. Said force tends to bring the first piston 54 into a nominal position along the axis Z if no force except for that of the fifth elastic element 55 is applied to the receiving surface 56. Said force is for example applied by the aligning pin 51, which is fixed to the upper shell 6.

Figure 13:
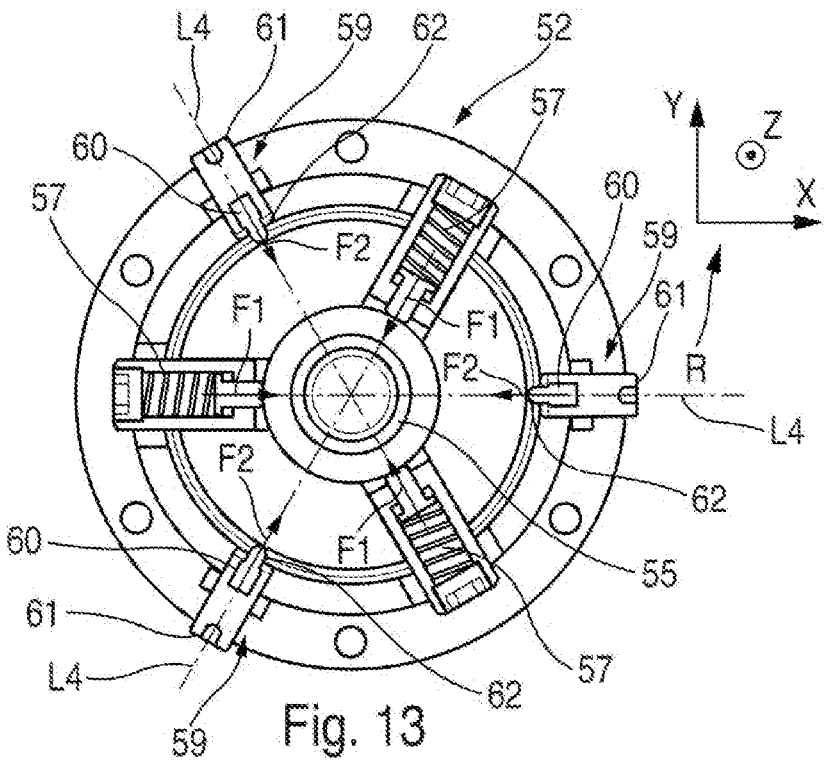
FIG. 13 is a cross section through the receiving interface along a plane P1.

The receiving interface 52 may moreover comprise at least one sixth elastic element 57 configured to exert a force F1 in a plane parallel to the axis X and the axis Y against the first piston 54 (FIG. 13). Said force F1 tends to bring the first piston 54 into a nominal position along the axis X and the axis Y. This or these seventh elastic element(s) 57 make it possible to allow a displacement amplitude of the first piston 54 in a plane parallel to the axis X and the axis Y in order to make it easier for the receiving surface 56 to receive the aligning pin 51.

The receiving interface 52 moreover comprises a second piston 58 and at least one adjusting element 59. The second piston 58 has a longitudinal axis parallel to the axis Z. The second piston 58 is movable in translation in a plane parallel to the axis X and the axis Y in relation to the cylinder 53 of the receiving interface 52. The second piston 58 is moreover fixed in terms of movement in translation along the axis Z. The first piston 54 is able to slide in the second piston 58.

The one or more adjusting elements 59 are configured to regulate a position of the second piston 58 in a plane parallel to the axis X and the axis Y by applying a force F2 against the second piston 58. As a result, by virtue of the adjusting element or adjusting elements 59, it is possible to regulate the nominal position of the second piston 58 in the plane parallel to the axis X and to the axis Y and, consequently, the nominal position of the first piston 54 and of the receiving surface 56 in the plane parallel to the axis X and to the axis Y.

Figure 12:
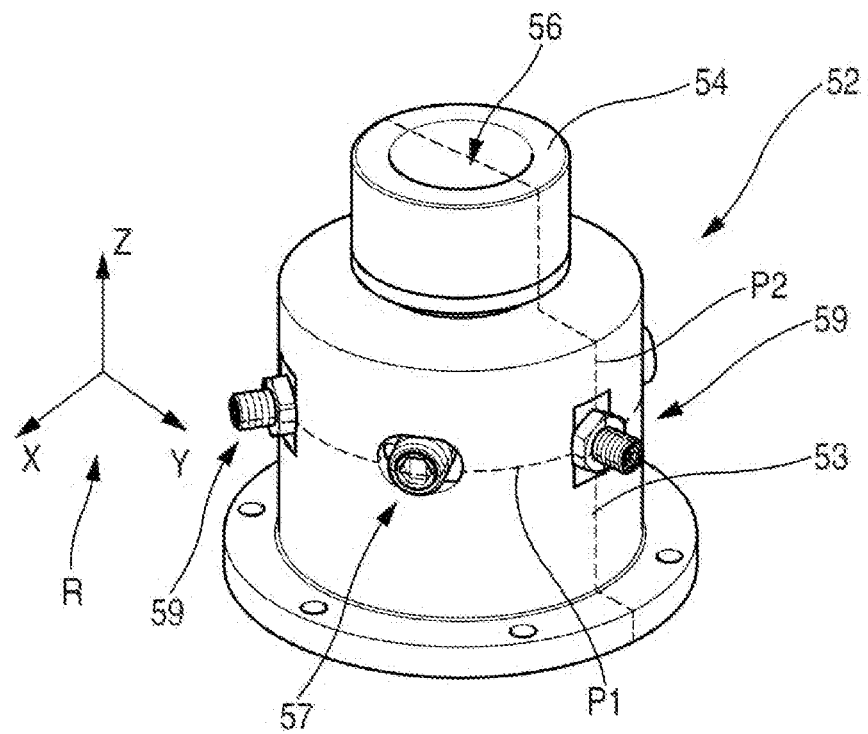
FIG. 12 is a perspective view of a receiving interface.
Figure 14:
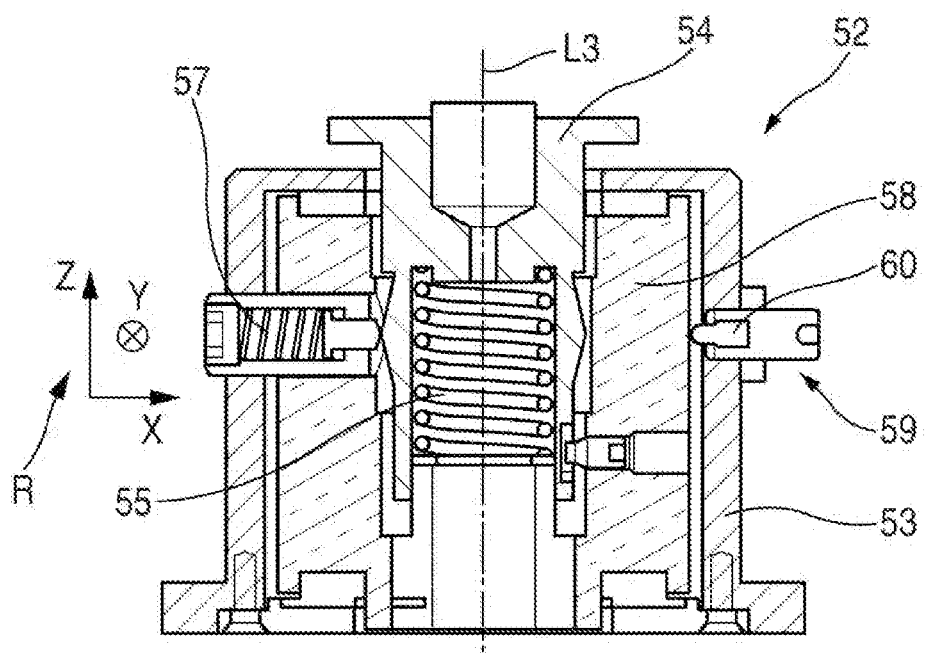
FIG. 14 is a longitudinal section through the receiving interface along a plane P2.

According to a non-limiting embodiment shown in FIGS. 12-14, the receiving interface 52 comprises three adjusting elements 59 and three elastic elements 57.

FIG. 13 corresponds to a section through the receiving interface 52 along the plane P1. FIG. 14 corresponds to a section through the receiving interface 52 along the plane P2.

The three adjusting elements 59 are distributed uniformly around the cylinder 53.

For example, they are distributed at 120° in relation to one another. Each of the three adjusting elements 59 comprises a screw 60 screwed in an opening through the cylinder 53. The screw 60 of each of the three adjusting elements 59 has longitudinal axes L4 comprised in a common plane parallel to the axis X and to the axis Y. The longitudinal axes L4 of each screw 60 are concurrent. The screw 60 of each of the three adjusting elements 59 comprises a first end 61 configured to receive a tool for screwing or unscrewing the screw 60 and a second end 62 configured to exert a force F2 parallel to the longitudinal axis L4 of the screw 60 against the second piston 58 depending on the degree of screwing and unscrewing of the screw 60.

The three elastic elements 57 are distributed uniformly around the cylinder 53. For example, they are distributed at 120° in relation to one another. Each of the seventh elastic elements 57 is able to exert a force F1 against the first piston 54.

Figure 7:
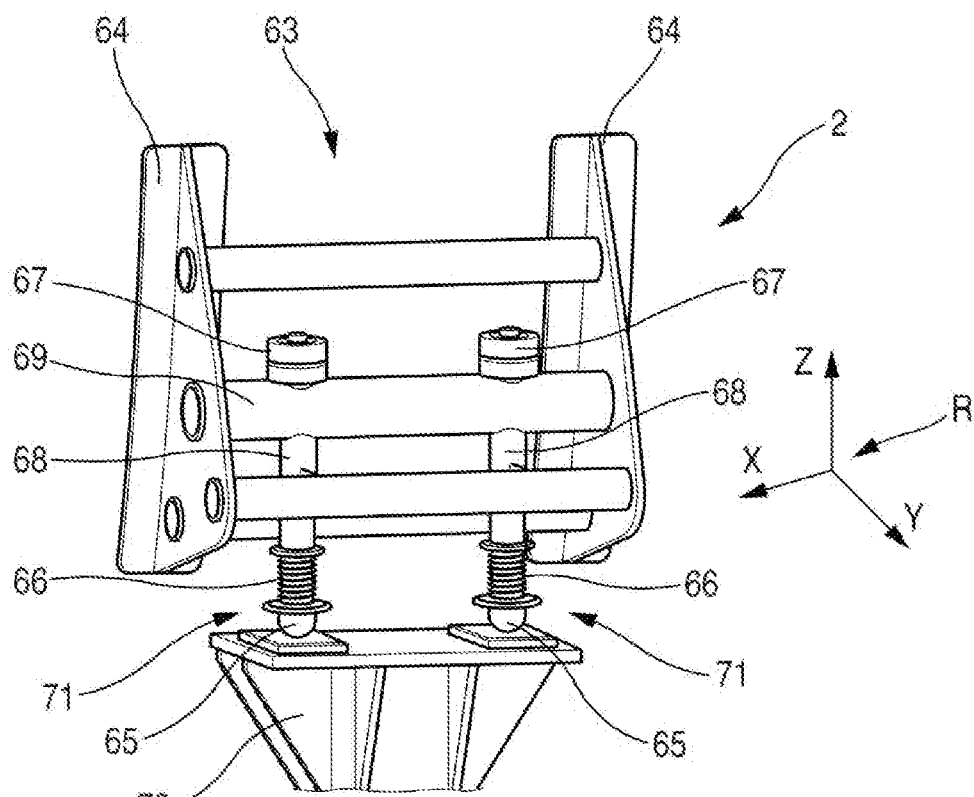
FIG. 7 is a perspective view of an auxiliary fixing part according to one embodiment.

The handling system 1 may also comprise at least one auxiliary fixing part 63, as shown in FIG. 7. The auxiliary fixing part 63 is intended to be fixed on the outer surface E of the side shell 2. The auxiliary fixing part 63 is moreover intended to rest on a support device 70 of the assembly platform 5, this support device 70 being disposed between two holding devices 11 of the assembly platform 5. The support device 70 may correspond to a support post. The auxiliary fixing part 63 may rest on the top of the support post. The auxiliary fixing part 63 may comprise an assembly having two fixing uprights 64 connected to one another by a supporting bar 69. The two fixing uprights 64 are intended to be parallel to the axis Z. The supporting bar 69 is intended to be parallel to the axis X. The auxiliary fixing part 63 moreover comprises at least one damping module 71 intended to rest on the support device 70.

The damping module 71 comprises a foot 65 and a seventh elastic element 66 (for example a spring) connecting the foot to the supporting bar 69. The seventh elastic element 66 has a predetermined stiffness such that the displacement of said assembly having the two fixing uprights 64 and the supporting bar 69 has a predetermined displacement amplitude along the axis Z about a nominal position of said assembly in relation to the foot 65. For example, the nominal position of said assembly corresponds to a position in which said assembly is not subjected to load by a force except for that of the seventh elastic element 66. The damping module 71 may also comprise a regulating element 67 for regulating the stiffness of the seventh elastic element 66.

The presence or the absence of the auxiliary fixing part 63 can depend on the length of the fuselage barrel 3 that is to be assembled and thus on the number of support devices 70.

Figure 16:
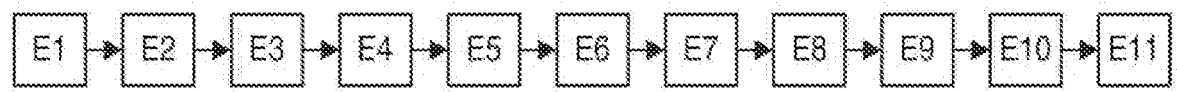
FIG. 16 is a schematic flow chart illustrating the assembly method steps E1 through E11.

The handling system 1 can be used by means of the following assembly method (FIG. 16).

The assembly method may comprise:
a step E1 of installing a lower shell 4 of the fuselage barrel 3 on an assembly platform 5,
a step E2 of fixing two side shells 2 to the fuselage body 3. Each of the two side shells 2 is fixed to two fixing devices 7 of a handling system 1. Each of the two side shells 2 is fixed to the two fixing devices 7 by means of the fixing part 9 of each of the two fixing devices 7,
a step E3 of aligning the two side shells 2 in relation to the lower shell 5 along a plane comprising the axis X and the axis Y by handling the two side shells 2 using the fixing support 10,
a step E4 of aligning the two side shells 2 in relation to the lower shell 5 along an axis parallel to the axis Z by handling the two side shells 2 using the first elastic element 12,
a step E5 of assembling the two side shells 2 with the lower shell 5.

The assembly method may also comprise:
a step E6 of fixing at least one holding structure 45 of the handling system 1 to the inner surface of each of the side shells 2,
a step E7 of fixing at least one aligning pin 51 on the inner surface of an upper shell 6 of the fuselage barrel 3,
a step E9 of depositing the aligning pin 51 on the receiving surface 52 by moving the upper shell 6 closer to the side shells 2,
a step E10 of aligning the upper shell 6 in relation to the side shells 2 along a plane comprising the axis X and the axis Y using the receiving interface 52 of the alignment module 50,
a step E11 of assembling the upper shell 6 with the side shells 2.

The method may also comprise a step E8 of positioning a floor grid G of the aircraft AC before step E9.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment (s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A handling system configured for handling a side shell of an aircraft with a view to assembling a fuselage barrel of the aircraft, the side shell is configured for assembly at least with a lower shell of the aircraft and an upper shell, the fuselage barrel after assembly being associated with an orthogonal reference system (R) defined by an axis X parallel to a longitudinal axis (L1) of the fuselage barrel, a horizontal axis Y and a vertical axis Z, wherein it comprises at least two fixing devices per side shell, each of the fixing devices being configured to be fixed to a longitudinal end of the side shell, each of the fixing devices having a fixing part, a fixing support and a first elastic element;
wherein the fixing part is configured to be fixed on an outer surface (E) of the side shell;
wherein the fixing support is configured to be mounted on a supporting device of an assembly platform, the fixing support is configured such that the fixing part and the first elastic element are movable in translation, in a plane comprising the axis X and the axis Y, in relation to the supporting device on which the fixing support is configured to be mounted;
wherein the first elastic element being fixed to the fixing part and to the fixing support, the first elastic element being configured to allow a displacement of the fixing part in relation to the supporting device along an axis parallel to the axis Z about a nominal position, the first elastic element having a predetermined stiffness such that the displacement of the fixing part has a predetermined displacement amplitude about the nominal position of the fixing part in relation to the fixing support.

2. The system as claimed in claim 1, wherein the fixing support further comprises a fork having a first end and a second end opposite the first end, the first end is configured to be mounted rotatably on a rod of a reference positioning device and so as to be movable in translation along the axis Y in relation to the rod, the reference positioning device is configured to be mounted fixedly on a holding device on which the fixing device is mounted, the rod having a longitudinal axis (L2) parallel to the axis X, the rod being movable in translation along the axis X, the fixing part being connected to the fork via the first elastic element between the first end and the second end of the fork;
- a mechanical ram mounted fixedly in terms of translational movement along the axis Z on the fixing support, the mechanical ram comprising a piston configured to be driven by the mechanical ram along the axis Z, the piston comprising a free end configured to be fixed to the second end of the fork;
- the fork being able to rotate about the longitudinal axis (L2) of the rod when the piston is driven by the mechanical ram along the axis Z, the rotation of the fork being able to cause the side shell to rotate about the longitudinal axis (L1) of the fuselage barrel.

3. The system as claimed in claim 1, wherein the first elastic element further comprises a compression spring having an upper end fixed to the fixing part and a lower end fixed to the fixing support, the lower end being in abutment against the fixing support, the compression spring being configured to exert an expansion force upward along the axis Z against the fixing part at its upper end.

4. The system as claimed in claim 1, wherein the fixing part further comprises
- a fixing frame having at least one upright shaped to closely follow at least in part the outer surface (E) of the side shell, the one or more uprights are configured to fix the fixing part on the outer surface (E) of the side shell; and
- a fixing bar having a longitudinal axis parallel to the axis X, the fixing bar being fixed to the first elastic element.

5. The system as claimed in claim 1, further comprising at least one holding structure configured to maintain the shape of the side shell, the holding structure comprising an arcuately curved bar configured to be fixed to the side shell such that it is located in a plane perpendicular to the axis X, the curved bar having a first end configured to be fixed to an upper edge of the side shell and a second end configured to be fixed on an inner surface (I) of the side shell;
- a straight bar having two ends fixed respectively to the first end of the curved bar and to the second end of the curved bar;
- a stay having a first end comprising a plate fixed to the curved bar and the straight bar, the plate being comprised in a plane comprising the curved bar and the straight bar, the stay moreover comprising a second end configured to be fixed to the inner surface (I) of the side shell, the stay having a longitudinal axis forming a non-zero angle with the plate.

6. The system as claimed in claim 1, wherein the first elastic element further comprises a tension spring having an upper end fixed to the fixing support and a lower end fixed to the fixing part, the lower end hanging freely from the fixing support, the tension spring being configured to exert a tensile force upward along the axis Z on the fixing part at its lower end.

7. The system as claimed in claim 6, further comprising an elastic device connecting the supporting device to the fixing part, the elastic device being configured to allow a displacement of the fixing part in relation to the supporting device along an axis parallel to the axis X and along an axis parallel to the axis Y about a nominal position, the elastic device having a predetermined stiffness such that the displacement of the fixing part has a predetermined displacement amplitude about the nominal position of the fixing part in relation to the supporting device.

8. The system as claimed in claim 1, wherein the fixing support further comprises a first end and a second end opposite the first end, the first end being configured to be mounted so as to be able to rotate in relation to the supporting device about an axis (L2) parallel to the axis X and mounted so as to be movable in translation along the axis Y in relation to the supporting device.

9. The system as claimed in claim 8, wherein the fixing support further comprises a yoke, the yoke having two legs and a plate connecting the two legs, the yoke being mounted so as to be movable in translation along the axis Y on a holding device, the yoke being connected to the holding device via a first end of the two legs, the plate connecting the two legs at a second end of the two legs that is opposite the first end of the two legs, the two legs each comprising a circular opening, the circular opening of each of the two legs each having a center aligned along an axis parallel to the axis X, the circular opening of each of the two legs is configured to receive a pin,
- wherein a mechanical ram is fixed on the plate of the yoke such that the free end of a piston of the mechanical ram is between the two legs of the yoke, the free end of the piston of the mechanical ram having a ring configured to receive the pin, the free end of the piston of the mechanical ram being configured to be fixed to the second end of a fork by way of introduction of the pin into the circular opening of each of the two legs and into the ring (23).

10. The system as claimed in claim 8, wherein the fixing support further comprises a fixing element configured to be fixed to a holding device, a mechanical ram being mounted so as to be movable in translation along the axis X at the fixing element, the first elastic element being mounted so as to be movable in translation at a fork along the axis Y.

11. The system as claimed in claim 8, wherein the fixing support further comprises at least one first guide rail fixed on the fixing element parallel to the axis X for mounting a mechanical ram at the fixing element so as to be movable in translation along the axis X,
- the fixing support comprises at least one second guide rail fixed on a fork parallel to the axis Y for mounting the first elastic element at the fork so as to be movable in translation along the axis Y.

12. The system as claimed in claim 8, wherein the fixing part further comprises a guiding crossmember having a longitudinal axis parallel to the axis Z, the guiding crossmember having a first end and a second end, the first end of the guiding crossmember being fixed to a fixing bar, the guiding crossmember passing through a fork between its first end and its second end, the helical spring having a first end fixed to the second end of the guiding crossmember and a second end fixed to the fixing bar, a helical spring surrounding the guiding crossmember.

13. The system as claimed in claim 8, wherein the fixing support further comprises a fixing element configured to be fixed to a holding device;

a second elastic element connecting a yoke to the fixing element, the second elastic element being configured to allow a displacement of the yoke in relation to the fixing element along an axis parallel to the axis Y, the second elastic element having a predetermined stiffness such that the displacement has a predetermined amplitude about a nominal position of the yoke in relation to the fixing element;

the first end of a fork comprising:
a support portion configured to be mounted rotatably on the rod of the reference positioning device;
a third elastic element, the third elastic element connecting the second end of the fork and the support portion, the third elastic element being configured to allow a displacement of the fork in relation to the support portion along an axis parallel to the axis Y, the third elastic element having a predetermined stiffness such that the displacement has a predetermined amplitude about a nominal position of the fork in relation to the support portion.

14. The system as claimed in claim 13, further comprising a fourth elastic element connecting the supporting device to the fixing part, the fourth elastic element being configured to allow a displacement of the fixing part in relation to the supporting device along an axis parallel to the axis X about a nominal position, the fourth elastic element having a predetermined stiffness such that the displacement of the fixing part has a predetermined displacement amplitude about the nominal position of the fixing part in relation to the supporting device.

15. The system as claimed in claim 14, wherein the first elastic element comprises at least one helical spring.

16. The system as claimed in claim 15, wherein the fixing part further comprises a first guiding crossmember having a longitudinal axis parallel to the axis Z, the first guiding crossmember having a first end mounted so as to be able to rotate about the axis X at a fork, the first guiding crossmember having a second end mounted so as to be movable in translation at a fixing bar, the helical spring having a first end fixed to the fork and a second end fixed to the fixing bar, the helical spring surrounding the first guiding crossmember, the first elastic element moreover comprises at least one second guiding crossmember parallel to the first guiding crossmember, the second guiding crossmember having a first end mounted so as to be able to rotate about the axis X at the fork, the second guiding crossmember having a second end mounted so as to be movable in translation at the fixing bar.

17. The system as claimed in claim 16, further comprising
at least one alignment module comprising an aligning pin configured to be fixed on an inner surface of the upper shell;
a receiving interface having a cylinder configured to be fixed to the first end of the curved bar, a first piston and a fifth elastic element, the first piston being able to slide in the cylinder, the first piston having a receiving surface configured to receive the aligning pin, the cylinder and the first piston having longitudinal axes (L3) parallel to the axis Z, the first piston being movable in translation along the axis Z in relation to the cylinder of the receiving interface, the fifth elastic element being configured to exert a force along the axis Z against the first piston, said force tending to bring the first piston into a nominal position along the axis Z if no force is applied to the receiving surface.

18. The system as claimed in claim 17, wherein the receiving interface further comprises a second piston having a longitudinal axis parallel to the axis Z, the second piston being movable in translation in a plane parallel to the axis X and the axis Y in relation to the cylinder of the receiving interface and fixed along the axis Z, the first piston being able to slide in the second piston;
at least one adjusting element configured to regulate a position of the second piston in a plane parallel to the axis X and the axis Y.

19. The system as claimed in claim 17, wherein the receiving interface further comprises at least one sixth elastic element configured to exert a force in a plane parallel to the axis X and the axis Y against the first piston, said force tending to bring the first piston into a nominal position along the axis X and the axis Y.

20. The system as claimed in claim 19, wherein the alignment module comprises three adjusting elements distributed uniformly around the cylinder, each of the three adjusting elements comprises a screw screwed in an opening through the cylinder, the screw of each of the three adjusting elements having longitudinal axes (L4) comprised in a common plane parallel to the axis X and the axis Y, the longitudinal axes (L4) of each screw being concurrent, the screw of each of the three adjusting elements comprising a first end configured to receive a tool for screwing or unscrewing the screw and a second end configured to exert a force parallel to the longitudinal axis (L4) of the screw against the second piston depending on the degree of screwing and unscrewing of the screw; three seventh elastic elements distributed uniformly around the cylinder, each of the seventh elastic elements being able to exert a force against the first piston.

21. A method for assembling a fuselage barrel of an aircraft using the handling system as claimed in claim 1, comprising:
a step (E1) of installing a lower shell of the fuselage barrel on an assembly platform,
a step (E2) of fixing two side shells of the fuselage barrel, each of the two side shells being fixed to two fixing devices of the handling system, each of the two side shells being fixed to two fixing devices by means of the fixing part of each of the two fixing devices,
a step (E3) of aligning the two side shells in relation to the lower shell along a plane comprising the axis X and the axis Y by handling the two side shells using the fixing support of the handling system,
a step (E4) of aligning the two side shells in relation to the lower shell along an axis parallel to the axis Z by handling the two side shells using the first elastic element of the handling system,
a step (E5) of assembling the two side shells with the lower shell.

22. The method as claimed in claim 21, further comprising:
a step (E6) of fixing at least one holding structure of the handling system to an inner surface of each of the side shells,
a step (E7) of fixing at least one aligning pin on the inner surface of an upper shell of the fuselage barrel,
a step (E9) of depositing the aligning pin on a receiving surface by moving the upper shell closer to the side shells,
a step (E10) of aligning the upper shell in relation to the side shells along a plane comprising the axis X and the axis Y using the receiving interface of the alignment module,
a step (E11) of assembling the upper shell with the side shells.

23. The method as claimed in claim 22, further comprising a step (E8) of positioning a floor grid (G) of the aircraft (AC) before the depositing step (E9).

\* \* \* \* \*